US008132454B2

(12) United States Patent
Nömmer et al.

(10) Patent No.: US 8,132,454 B2
(45) Date of Patent: Mar. 13, 2012

(54) SENSOR AND DEVICE FOR EXAMINING SHEET MATERIAL, AND SENSOR MAINTENANCE METHOD

(75) Inventors: Franz Nömmer, Dorfen (DE); Michael Fiedler, München (DE); Robert Klus, München (DE); August Häusler, Wolfratshausen (DE)

(73) Assignee: Giesecke & Devrient GmbH, Munich (DE)

( * ) Notice: Subject to any disclaimer, the term of this patent is extended or adjusted under 35 U.S.C. 154(b) by 201 days.

(21) Appl. No.: 12/513,981

(22) PCT Filed: Nov. 8, 2007

(86) PCT No.: PCT/EP2007/009699

§ 371 (c)(1),
(2), (4) Date: May 7, 2009

(87) PCT Pub. No.: WO2008/055686

PCT Pub. Date: May 15, 2008

(65) Prior Publication Data

US 2010/0000312 A1 Jan. 7, 2010

(30) Foreign Application Priority Data

Nov. 9, 2006 (DE) ........................ 10 2006 052 798

(51) Int. Cl.
*G01L 5/04* (2006.01)

(52) U.S. Cl. ........................................... 73/159; 73/760

(58) Field of Classification Search .................... 73/159, 73/760

See application file for complete search history.

(56) References Cited

U.S. PATENT DOCUMENTS

| | | | | |
|---|---|---|---|---|
| 4,378,109 | A * | 3/1983 | Takahashi et al. | 271/263 |
| 4,928,129 | A * | 5/1990 | Honda | 347/138 |
| 5,013,911 | A | 5/1991 | Koshida et al. | |
| 5,172,003 | A | 12/1992 | Nasu et al. | |
| 5,187,531 | A * | 2/1993 | Ozawa et al. | 355/72 |
| 5,903,339 | A | 5/1999 | Levasseur | |
| 5,988,345 | A | 11/1999 | Bergeron et al. | |
| 6,344,895 | B1 | 2/2002 | Yasuda et al. | |
| 6,763,997 | B2 * | 7/2004 | Bennett et al. | 235/375 |
| 6,810,224 | B2 * | 10/2004 | Ahn | 399/167 |
| 6,961,118 | B2 * | 11/2005 | Rolon et al. | 355/75 |
| 7,573,619 | B2 * | 8/2009 | Tsai et al. | 358/498 |
| 2003/0146275 | A1 * | 8/2003 | Bennett et al. | 235/376 |
| 2004/0129893 | A1 | 7/2004 | Usami et al. | |
| 2004/0251605 | A1 * | 12/2004 | Hsieh | 271/186 |

FOREIGN PATENT DOCUMENTS

| | | | |
|---|---|---|---|
| DE | 3242789 | C1 | 3/1984 |
| DE | 19935856 | A1 | 2/2001 |
| DE | 102004020309 | A1 | 11/2005 |
| WO | WO 2005/103627 | A2 | 11/2005 |

* cited by examiner

*Primary Examiner* — Max Noori
(74) *Attorney, Agent, or Firm* — Bacon & Thomas, PLLC

(57) ABSTRACT

Sensor components having sides facing the sheet material have one or a plurality of front elements which are detachable and replaceable with low effort. So in the case of wear of the sensor fronts, entire sensor components no longer have to be replaced but only individual front elements of the sensor component are replaced. The front elements do not contact the inner area of the housing and the sensitive measuring elements arranged therein. When the front elements are detached from the housing for maintenance, the measuring elements remain dustproof encapsulated in the housing of the sensor component. The front elements preferably have a comb structure which improves the transport of the bank notes at the transition between the sensor components.

25 Claims, 5 Drawing Sheets

SENSOR AND DEVICE FOR EXAMINING SHEET MATERIAL, AND SENSOR MAINTENANCE METHOD

FIELD OF THE INVENTION

The invention relates to a sensor for checking sheet material, such as for example bank notes, as well as an apparatus in which such sensor is incorporated, such as for example a bank note processing machine. Furthermore, the invention relates to a method for maintaining the sensors.

BACKGROUND

In bank note processing machines bank notes are checked with the aid of sensors for example as to their type with respect to currency or denomination, as to their authenticity, or their state. For this purpose the bank notes are conveyed by a transport system and thereby pass through a sensor path with one or a plurality of sensors. From the prior art (e.g. DE 32 42 789 C1) bank note processing machines are known the sensors of which each have two sensor components which are arranged on opposite sides of the sensor path. In the sensor components there are arranged sensitive measuring elements which must be protected from environmental influences—for example dust and soil particles which are brought into the machine by the bank notes.

With some sensors the bank notes guided past the sensor components touch the front side of the housing of the sensor component facing the bank notes. Here in the course of time the front side wears out which can impair the transport of the bank notes. For maintaining the bank note processing machines installed at the customer, in the case of wear complete sensor components must be replaced by new ones. After the replacement a readjustment of the replaced sensor components may also be necessary. Altogether, this means that a great effort is necessary and that costs for maintaining the sensors of bank note processing machines will accrue.

When bank notes are guided past sensors in a fashion according to the prior art, in case of high transport speeds a bank note jam may occur. Critical points are, in particular, narrow places and transitions between different components which laterally limit the transport path of the bank notes.

Therefore, it is the object of the invention to reduce the effort for maintaining the sensors and to achieve a trouble-free transport of the sheet material along the sensors even at high transport speeds.

SUMMARY

The invention is based on the idea to provide the sides of the sensor components facing the sheet material with front elements. In the case of wear or soiling of the sensor fronts then no longer the complete sensor components but only the front elements of the sensor components have to be replaced. At the side of the housing of the respective sensor component facing the sheet material there are fixed one or a plurality of front elements which are detachable from the housing and thus replaceable with low effort. The at least one front element is advantageously arranged outside the housing and does not contact the inner area of the housing and the sensitive, for example optical, measuring elements for detecting or generating the measuring signal of the sensor arranged therein. When the at least one front element is detached from the housing for maintenance, thus the measuring elements remain dustproof encapsulated in the housing of the sensor component. Replacing the at least one front element thus can be carried out without any negative influence on the technical measuring equipment and the function of the sensor. Advantageously, thus even those measuring elements which are directly enclosed by the housing of the sensor component, and therefore would only be insufficiently protected when the housing is opened, can remain encapsulated by the housing and thus protected from dust and soil particles.

By the front elements designed detachable the cleaning of soiled sensor fronts is simplified. Instead of a hardly practicable cleaning within the apparatus, soiled front elements can be removed on a short stop of the operation of the apparatus and replaced by new or cleaned front elements. Thus, the operation of the apparatus has to be interrupted only a short time. Here, either individual front elements can be detached and replaced or also the complete sensor front of front elements and a window arranged at the sensor front. If the window, too, is to be detached for cleaning, the sensor components are designed such—for example by an additional window—that their housing is still dustproof encapsulated despite the detached window.

For maintaining a sensor the one or more front elements and/or the window are detached from the sensor component, and then, instead, a new or cleaned front element and/or a new or cleaned window is arranged at the sensor component. At the same time the measuring elements remain encapsulated by the housing of the sensor component. As a new or cleaned front element and/or window, here, for example a previously detached front element or window can be used.

During the operation of the apparatus the front elements can at least temporarily contact the transported sheet material which enters and leaves the detection area of the sensor. Due to the mechanical contact of the sheet material guided past, the front elements are subject to wear, the reaction to which is the replacement of the front elements. In order to restrict the wear as much as possible to the front elements and/or in order to avoid a direct contact between window and sheet material, the windows of the sensor components facing the sheet material—when viewed from the transported sheet material—can be arranged offset back in relation to the at least one front element of the sensor component.

The transport direction of the sheet material defines at each of the sensor components, which are arranged along the transport path of the sheet material, an entry side on which the sheet material is guided into the detection area of the sensor component and an exit side on which the sheet material is guided out of the detection area. The at least one front element, preferably, is designed and fixed to the housing of the sensor component such that it is chamfered at its side facing the entry side—at its surface pointing to the transport path. Additionally, it can also be chamfered at its side facing the exit side. Due to these chamfers the at least one front element has obtuse-angled edges in close proximity to the transported sheet material and no edges impairing the transport, so that the sheet material is guided into the front area of the sensor component. Therefore, a sheet material transport without problems with low susceptibility to jams is achieved.

The individual sensor components preferably consist of at least one front element and the housing on the front side of which the at least one front element is arranged. In an embodiment to the front side of the sensor component there are fixed a plurality of, for example two, front elements, one of which is arranged at the entry side and the other one at the exit side. The two front elements, preferably, are designed such that they can be selectively mounted either at the entry side or at the exit side. In another embodiment to the front side of the sensor components there is fixed a front element which extends from the entry side to the exit side of the sensor component and forms a frame around the window of the sensor component.

The front elements are formed, for example, such that they can be selectively fixed in two different orientations to the housing of the sensor component, wherein the two orientations can be converted into each other by a 180°-rotation of the respective front element around an axis perpendicular to a front plane of the sensor component.

In a preferred embodiment each of the front elements has one or a plurality of comb structures which are arranged at the entry side and/or at the exit side of the sensor component. The comb structures have a plurality of gaps and a plurality of teeth, which for example at their surface are chamfered, and can also protrude over the housing of the sensor component at the entry side and/or at the exit side of the sensor component. To permit a quick and trouble-free transport of the sheet material from a sensor component to a sensor component arranged adjacently, the comb structures of adjacent front elements preferably are formed such that they match and/or mutually engage, i.e. that teeth of the one front element at least partially can be arranged in gaps of the adjacent front element and vice versa. This facilitates the sheet material transport into and out of the detection area of the sensor, especially in the transition area of a plurality of sensor components arranged adjacently.

So as to be able to use the same front elements at different adjacent sensor components, the comb structures of the front elements are preferably formed such that they not only match lined up in a specific order but also lined up in reverse order and/or can be arranged in a mutually engaging fashion. Especially advantageously, each individual front element, independently of the order of the sensor components along the transport path of the sheet material, can be used as a front element of each one of the sensor components. For this purpose at the entry side of the sensor component the front element has at least one first comb structure which matches with at least one second comb structure at the exit side of the sensor component, the second comb structure being formed as a counterpart to the first one.

Especially preferred, at least some of the gaps of the comb structures are positioned such that a plurality of transport rollers arranged adjacent to the sensor component at least partially can be arranged in the gaps. Here, the transport rollers project or protrude at least partially over the front plane of the sensor component or project over the front elements in the direction perpendicular to the plane of the front elements, in the direction of the transport path of the sheet material. Preferably, the transport rollers are arranged along dividing lines, which each defines the transition between the sensor components arranged adjacently or between their front elements. In particular, the vertices of the transport rollers are arranged along the dividing lines between the adjacent sensor components or between the adjacent front elements. At the transition area between adjacent sensor components critical for the sheet material transport the sheet material is at least partially lifted by the projecting or protruding transport rollers. Thus, the sheet material is advantageously guided from a sensor component over the dividing line to the adjacent sensor component. In this way it is prevented that the sheet material threads or gets caught in the transition area and causes a transport jam.

Especially preferred, the at least one front element at least partially consists of a non-transparent material so that for example in the case of an optical sensor the leaking of scattered light through the front element is avoided. Additionally, the surface of the at least one front element preferably has favorable sliding properties to the transported sheet material. For this purpose, for example at the surface of the at least one front element a material with a low sliding friction coefficient to the sheet material can be provided or the surface can be specifically smoothed. Even the entire front element can be composed of the material having a low sliding friction coefficient. Preferably, hardened or hard-coated aluminum or plastic materials with a low sliding friction coefficient to sheet material which for example contain nylon, polyamide or ABS (acrylonitrile-butadiene-styrene), serve as a material for the surface of the at least one front element.

For fixing the front elements to the housing of the respective sensor component these can be glued on, for example with an adhesive tape coated with adhesive on both sides. But the front elements can also be mechanically clamped or screwed to the housing or fixed to the housing by a snap connection.

In an apparatus for checking sheet material a plurality of sensor components can be arranged at one side or at both sides of the transport path of the sheet material. A sensor for example can consist of two sensor components which are arranged opposite each other at both sides of the transport path.

With the sensor components having detachable front elements designed according to the invention there can be additionally achieved the result that the housings of the sensor components with the measuring elements arranged therein can be selectively used on the one or the other of the two opposite sides of the transport path. In the case of one or a plurality of front elements of a sensor component chamfered on one side at the entry side, then the one or more front elements merely have to be mounted according to the transport direction of the sheet material such that their chamfer lies at the entry side of the sensor component. Therefore, the field service, advantageously, must keep only one type of sensor components available the front elements of which can be fixed in one of the two required orientations, as needed, to the housing.

The sensor components of the sensors according to the invention can be parts of different kinds of sensors, e.g. mechanical sensors, magnetic sensors, capacitive sensors, photosensors in the UV, VIS or IR or of ultrasonic sensors.

The sheet material for the checking of which the sensor according to the invention can be used, for example are bank notes, documents of value, tickets or the like. The apparatus for checking sheet material for example is a bank note processing machine.

BRIEF DESCRIPTION OF THE DRAWINGS

In the following the invention is described by way of example with reference to the accompanying figures.

DETAILED DESCRIPTION OF VARIOUS EMBODIMENTS OF THE DISCLOSURE

Figure 1:
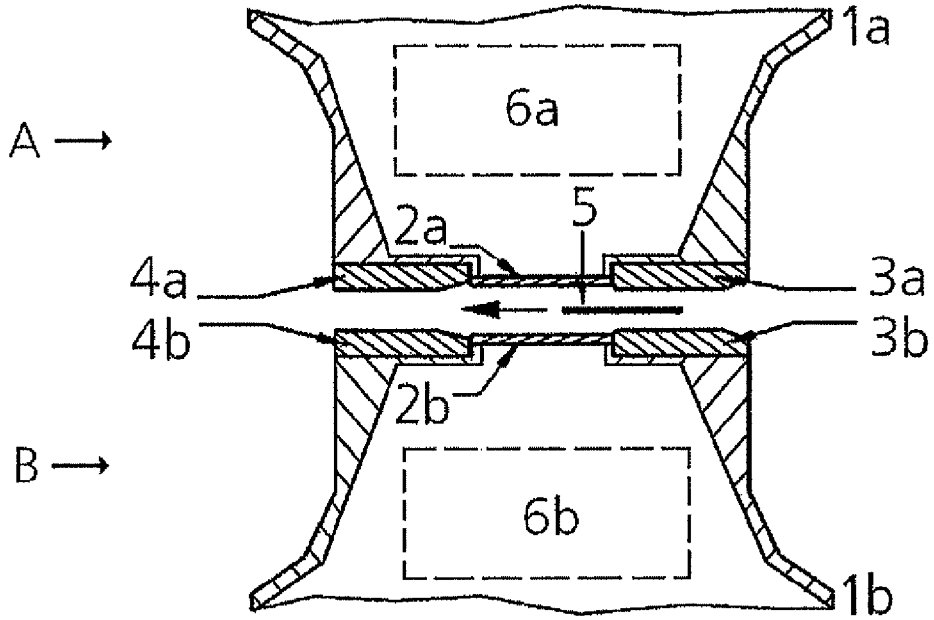
FIG. 1 shows a sectional view of a sensor having two sensor components arranged opposite each other, between which the bank notes are guided through, and FIG. 2*a-e* show five different embodiments of the front sides of the sensor components with the detachable front elements.

In FIG. 1 is shown by way of example an optical sensor of a bank note processing machine having two sensor components A and B. Between the two sensor components A, B is provided a gap for transporting bank notes 5 along their transport path in transport direction which is indicated with the arrow pointing away from bank note 5. At each of the front sides of the two sensor components A, B the two housings 1*a*, 1*b* are dustproof enclosed by two windows 2*a*, 2*b*. At each of the two housings 1*a*, 1*b* are arranged two front elements 3*a*, 4*a* or 3*b*, 4*b*. The windows 2*a*, 2*b*, as shown in FIG. 1, can be arranged offset back in relation to the front elements 3*a*, 4*a* or 3*b*, 4*b*. In this case for a proper transport of the bank notes it is necessary to chamfer the front elements 4*a*, 4*b*, which are mounted at the exit side of the sensor components A, B, at their side facing the entry side of the sensor components A, B. In order to facilitate the guiding of bank note 5 into the detection area of the sensor, the front elements 3*a*, 3*b*, which are arranged at the entry side of the sensor components A, B, are also chamfered at their side facing the entry side, of FIG. 1. The front elements 3*a*, 4*a* or 3*b*, 4*b* can be detached from their respective housing 1*a* or 1*b*, while the respective housing 1*a*, 1*b* remains enclosed, so that the measuring elements 6*a*, 6*b* (only schematically shown) arranged in the housings 1*a*, 1*b* remain encapsulated and thus remain protected against dust and soil particles. For this purpose the front elements 3*a*, 4*a* or 3*b*, 4*b* are connected with the respective housing 1*a* or 1*b* in a detachable fashion, for example by a double faced adhesive tape. The transport of the bank notes can be effected such that bank notes 5 touch the front sides of the sensor components A, B, i.e. the elements 2*a*, 3*a*, 4*a* or 2*b*, 3*b*, 4*b*. Because of the contact between bank notes 5 and front elements in this case it is advantageous to provide the front elements 3*a*, 3*b*, 4*a*, 4*b* on their surface with a special material which has favorable sliding properties to the bank notes, for example with one or a plurality of the plastic materials nylon, polyamide or ABS-containing plastic mixtures, such as e.g. ABS polycarbonate. But, alternatively, a contactless transport of the bank notes 5 through the gap between the sensor components A, B can also be effected.

In the example shown in FIG. 1 the sensor components A and B each can be used either on the one side of the transport path (on the top in FIG. 1) or—after a 180°-rotation around an axis perpendicular to the plane of projection—on the opposite side of the transport path (at the bottom in FIG. 1). The housings 1*a*, 1*b* with the measuring elements 6*a*, 6*b* arranged therein thus can be used on each of the two opposite sides of the transport path. Therefore, the sensor components A and B can be identical—except for the arrangement of the front elements. The front elements 3*a*, 4*a* and 3*b*, 4*b* mounted at the housings 1*a* and 1*b* are to be mounted—due to their one-sided chamfer—in different orientations relative to the respective sensor component at the two opposite sensor components A, B. These orientations are defined by the respective transport direction of the bank notes 5 relative to the respective sensor component A, B. So as to be able to mount them orientated in both directions, the front elements 3*a*, 3*b*, 4*a*, 4*b* are designed and fixed such that they can be selectively mounted with the chamfer at the entry side or the exit side at the respective housing 1*a*, 1*b*.

Figure 2A:
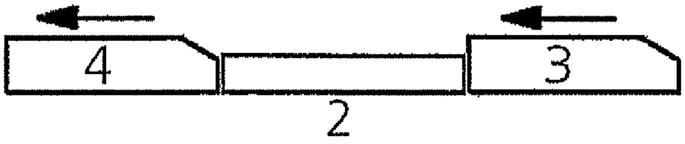
Figure 2B:
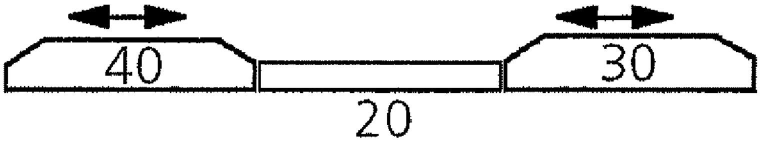
Figure 2C:
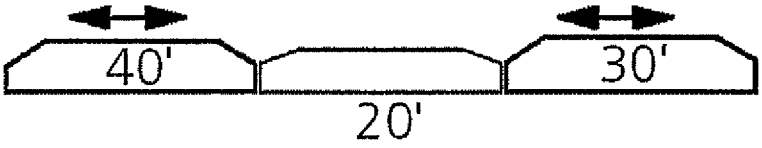

With front elements 3, 4 which are chamfered on one side at the side facing the entry side of the sensor component, the transport direction of the bank notes relative to the sensor component is predetermined as shown by the arrows in FIG. 2*a*. The correct orientation of the front elements is to be observed in particular when the technical measuring equipment of the respective sensor requires that the bank notes are guided past very near the sensor front. Besides the front elements chamfered on one side 3, 4, the front elements 30, 30', 40, 40' of an alternative embodiment can also be chamfered at both sides, at the entry side and at the exit side, cf FIGS. 2*b*, 2*c*. Because of the symmetric design of the front elements 30, 30', 40, 40', the sensor components can be used on each of the two sides of the transport path even without a specifically adjusted orientation of their front elements. In this way the bank notes can be transported in the two directions relative to the sensor component, cf the arrows in FIGS. 2*b*, 2*c*. The windows 20, 20', for example, can be plane on their surface (cf window 20 in FIG. 2*b*) or also chamfered at one (not shown) or at two sides (cf window 20' in FIG. 2*c*).

Figure 2D:
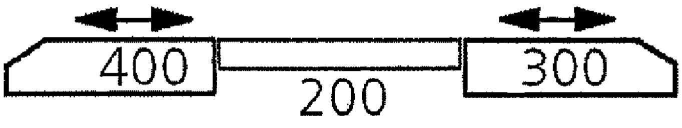
Figure 2E:
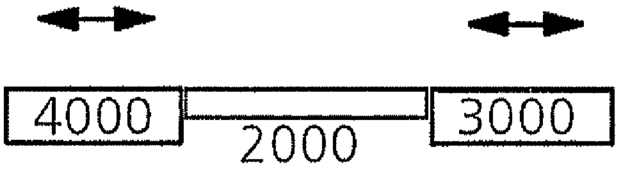

In a further alternative embodiment the windows 200 or 2000 and the front elements 300, 400 or 3000, 4000 can also be arranged flush, so that between these elements there are no steps in the close proximity of the transported bank notes, cf FIGS. 2*d* and 2*e*. By additionally chamfering the front elements 300, 400 at the outsides of the sensor component, the bank notes then, likewise, can be transported in both directions relative to the sensor component, cf arrows in FIG. 2*d*. For sensor components which are mounted such that their front sides observe a sufficient distance to the transported bank notes, or their technical measuring equipment allows a sufficient distance to the transported bank notes, the simple geometry of the front elements 3000, 4000 without chamfers may be sufficient, cf arrows more space-apart in FIG. 2*e*. In this case, likewise, a transport of the bank notes in two directions relative to the sensor component is possible.

The representations of FIG. 2 show only some possibilities of how the front elements and windows can be arranged. However, as long as the transport of the bank notes is not impaired, the details of these arrangements can be combined. For example, likewise, front elements 4 or 40 chamfered at one or at both sides can be used instead of the front elements 400 or 4000, or the window 20' can be used instead of the window 2. The embodiments of the sensor front represented in FIG. 2 not only relate to the case of two front elements, but also to the embodiments described in the following having one single front element per sensor component.

Figure 3A:
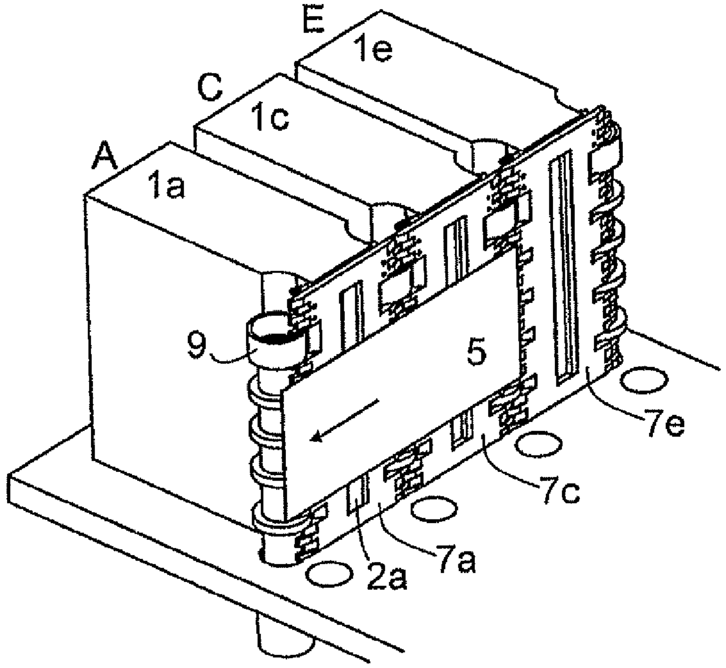
FIG. 3*a-d* show perspective views of a plurality of adjacent (FIG. 3*a*) or opposite (FIG. 3*c*, 3*d*) sensor components with front elements which have comb structures at the entry side and exit side, and a detailed view of the engaging of the comb structures (FIG. 3*b*)

In FIG. 3*a* is shown a perspective view of three adjacent sensor components A, C, E, which are arranged on one side of the transport path of the sheet material 5. This arrangement, for example, can be part of a sensor path in a bank note processing machine. Opposite to each of the sensor components A, C, E there can be arranged further sensor components B, D, F, cf FIG. 3*c*. Each of the sensor components with the housings 1*a*, 1*c*, 1*e* is provided with a front element 7*a*, 7*c*, 7*e* at which the bank notes 5 are guided past in the direction of the arrow. The front elements 7*a*, 7*c*, 7*e* each have a comb structure 8, 8' on their entry side and on their exit side.

Figure 3B:
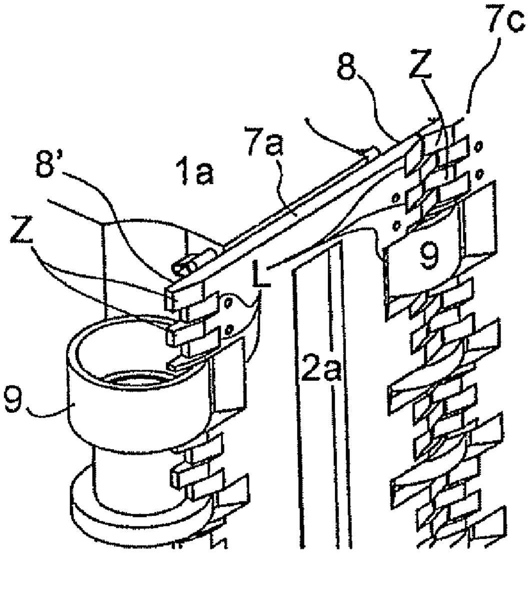

FIG. 3*b* shows in detail the comb structures 8, 8' of the front element 7*a*, which have a plurality of teeth Z and a plurality of gaps L. In some of the gaps L engage the teeth Z of the adjacent front element 7*c* which is identical in construction with the front element 7*a*. In some other, directly opposite positioned gaps L of the comb structures 8, 8' of the two adjacent front elements 7*a*, 7*c* there are arranged transport rollers 9 with which the sheet material 5 is guided past the sensor components A, C, E. The comb structures 8, 8' of the adjacent front elements 7*a*, 7*c* match like counterparts. The front elements 7*a*-7*f* are transferable from one sensor component to the next and can be lined up in any desired order.

Figure 3C:
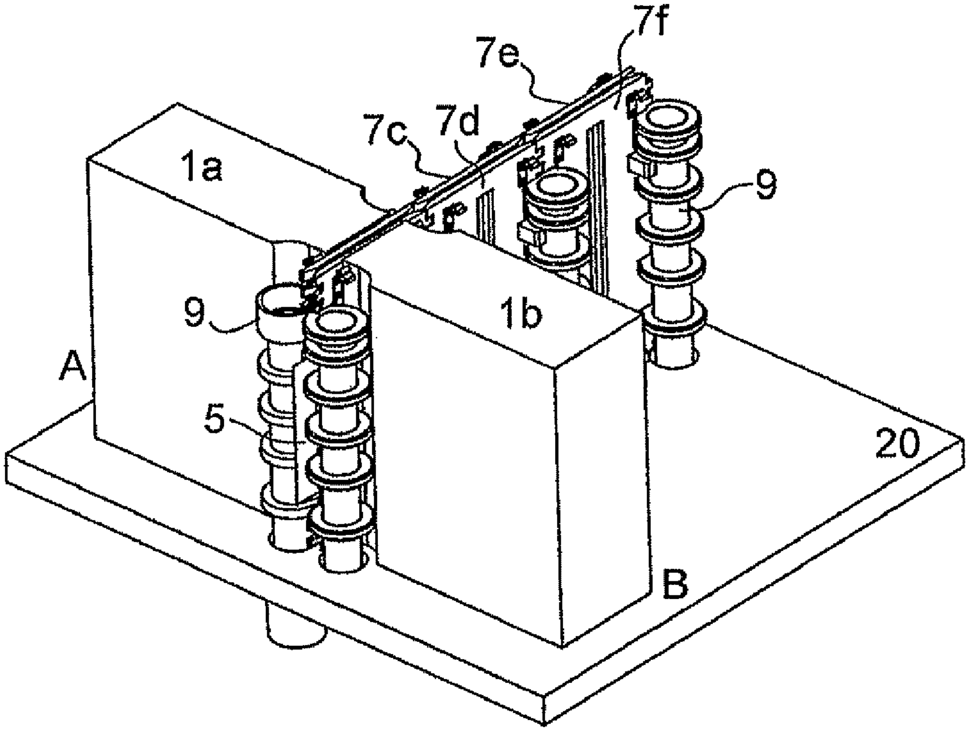

FIG. 3*c*, analogously to FIG. 3*a*, shows the arrangement of a plurality of sensor components along a sensor path for bank notes. Of each of the sensor components A, B, C, D, E, F, which for example are fixed to a mounting plate 20, only the front elements 7*a*-7*f* are shown as well as by way of example the housings 1*a*, 1*b* of two opposite sensor components A and B. For clarity's sake the housings 1*c*-1*f* are not drawn in FIG. 3*c*. Between the front elements 7*a*-7*f* there is a narrow gap in which bank notes are guided along their transport path, for example with the aid of the transport rollers 9, past the sensor components A-F.

Figure 3D:
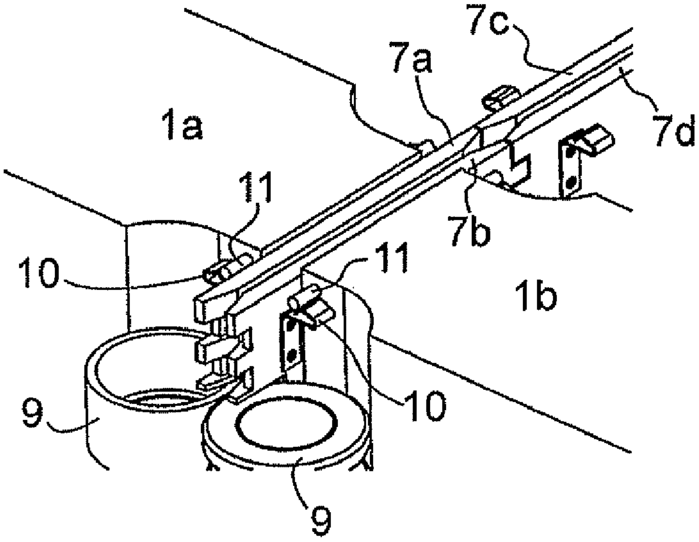

The front parts of the opposite sensor components A and B are shown in detail in FIG. 3*d*. In order to fix the front elements 7*a*-7*f* to their respective housings 1*a*-1*f*, the sensor components have a plurality of springs 10. Per front element, for example, four springs are used, which are arranged at the entry and exit side of the sensor component and on the right and on the left of the transport path of the bank notes (on the top and at the bottom in FIG. 3*c*). The springs 10 are screwed to the front element and each is clamped against a fixing pin 11 provided for each spring 10 which is mounted at the respective housing 1*a*, 1*b* of the sensor components A, B at the respective position. The springs 10 clamped against the fixing pins 11 form a snap connection between the housing 1*a*, 1*b* and the front element 7*a*, 7*b* of the respective sensor component A, B.

Figure 4:
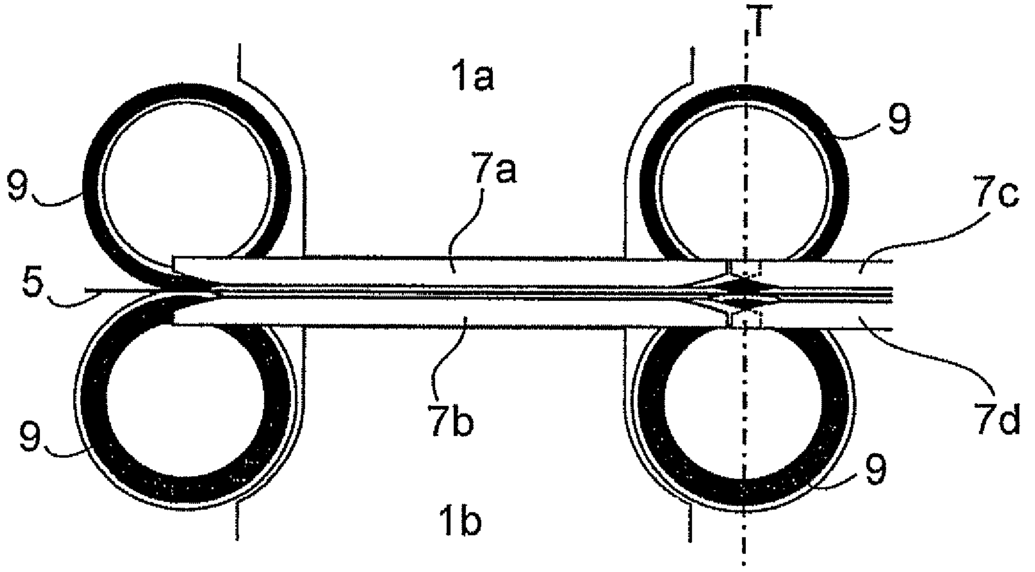
FIG. 4 shows a side view of two opposite sensor components each with the transition to an adjacent sensor component, at which the front elements engage in comblike fashion and at which transport rollers for the sheet material are arranged.

In FIG. 4 is shown a detail of the front parts of the sensor components A-F in a side view. The transport rollers 9 reach through the front elements 7*a*-7*f* in the gaps L provided therefor (cf FIG. 3*b*) and project over the surfaces of the front elements 7*a*-7*f* facing the bank notes 5. The front elements 7*a*, 7*c* and 7*e* or 7*b*, 7*d* and 7*f* toothed in a comblike fashion are separated by a dividing line T which, for example, symmetrically cuts through the teeth of the adjacent front elements. To ensure a trouble-free transport of the bank notes between the adjacent sensor components A, C and E or B, D and F, the transport rollers 9 are arranged such that their vertex approximately lies on the dividing line T. Since the transport rollers 9, moreover, protrude over the surfaces of the front elements 7*a*-7*f*, the bank notes 5 guided past along the sensor path are lifted a little by the transport rollers 9 and are reliably conveyed over the transitions between the front elements 7*a*-7*f*.

The invention claimed is:

1. A sensor for checking sheet material comprising:

at least one sensor component comprising a housing configured in a way such that the housing encapsulates measuring elements of the sensor component, and at least one front element configured in a way such that the at least one front element is detachable from the housing while the measuring elements remain encapsulated by the housing, wherein the sensor component has a first side at which transported sheet material is guided into a detection area of the sensor component and a second side at which the transported sheet material is guided out of the detection area of the sensor component, and wherein the front element is chamfered at either of or both of a side facing the first side and a side facing said second side.

2. The sensor according to claim 1, wherein, when the front element is detached from the housing, the measuring elements are encapsulated in a dustproof enclosed inner area of the housing.

3. The sensor according to claim 1, wherein the sensor component includes a window which is offset back in relation to the front element of the sensor component.

4. The sensor according to claim 3, wherein the sensor component has a front element which forms a frame around the window of the sensor component.

5. The sensor according to claim 1, wherein the front element is selectively fixable to the housing of the sensor component in two different orientations, wherein the two orientations are convertible into each other by a 180° -rotation of the front element around an axis extending perpendicular to a front plane of the front element.

6. The sensor according to claim 1, wherein the sensor component has at least two front elements which are formed in a way such that the at least two front elements can be selectively arranged at the first side or at the second side of the sensor component.

7. The sensor according to claim 1, wherein the front element includes at least one comb structure which is arranged at at least one of the first side, and the second side of the sensor component.

8. The sensor according to claim 7, wherein at least one of the comb structures of the front element protrudes over the housing of the sensor component at at least one of the entry first side, and the second side of the sensor component.

9. The sensor according to claim 1, wherein the front element has at least one first comb structure at the first side and at least one second comb structure at the second side of the sensor component, the second comb structure being formed as a counterpart to the first comb structure.

10. The sensor according to claim 7, wherein the comb structure has a plurality of gaps and a plurality of teeth, wherein at least some of the gaps of the comb structure are positioned such that a plurality of transport rollers arranged adjacent to the sensor component at least partially are locatable in the gaps.

11. The sensor according to claim 9, wherein the comb structure and a further comb structure of a further front element, which is part of a further sensor component, are arranged adjacent to each other along the transport path of the sheet material, so as to be at least one of mutually engagable and matchable.

12. The sensor according to claim 1, wherein the front element comprises a non-transparent material.

13. The sensor according to claim 1, wherein the transported sheet material has a sliding coefficient of friction and the front element at least on its surface comprises a material having a sliding coefficient of friction, wherein the ratio of the sliding coefficient of friction of the front element material relative to the sliding coefficient of friction of the transported material is less than 0.3.

14. The sensor according to claim 1, wherein the front element at least on its surface comprises hardened or hard-coated aluminum or a plastic material with a relatively low sliding friction coefficient relative to the sliding friction coefficient of the sheet material.

15. The sensor according to claim 1, wherein the front element is fixed to the housing by gluing.

16. The sensor according to claim 1, wherein the front element is clamped or screwed to the housing or is fixed to the housing by a snap connection.

17. An apparatus for checking sheet material comprising at least one sensor according to claim 1.

18. The apparatus for checking sheet material according to claim 17, wherein the sensor component is a first sensor component which is arranged at a first side of a transport path of the sheet material, and including either or both at least one second sensor component of the sensor and at least one other second sensor component of at least one other sensor at a second side of the transport path of the sheet material and which second side is located opposite the first side of the transport path, wherein the first sensor component is also usable at the second side of the transport path, and the other second sensor component is usable at the first side of the transport path.

19. The apparatus according to claim 17, wherein the front element comprises at least one comb structure having a plurality of gaps and a plurality of teeth, wherein at least some of the gaps of the comb structure are positioned such that at least one transport roller arranged adjacent to the sensor component is locatable at least partially in the gaps.

20. The apparatus according to claim 17, including at least two sensor components which are arranged adjacent to each other along the transport path of the sheet material, wherein the sensor components each have at least one front element each having at least one comb structure, wherein at least two of the comb structures of the front elements of the sensor components that are arranged adjacent to each other are mutually engaged.

21. The apparatus according to claim 17, including at least one transport roller having at least two sensor components which are arranged adjacent to each other along the transport path of the sheet material, wherein the sensor components arranged adjacently have at least two mutually engaging front elements, the transition of which is defined by a dividing line at which the transport roller is located.

22. A method for maintaining the sensor as recited in claim 1, comprising the steps:

detaching the front element from the sensor component, arranging a new or cleaned front element at the sensor component, wherein, during the maintenance, the measuring elements remain encapsulated by the housing of the sensor component.

23. The method according to claim 22, wherein the front element is cleaned after its detachment from the sensor component.

24. The method according to claim 22, wherein, with the front element a window of the sensor component is also detached and wherein with the new or cleaned front element a new or cleaned window is also arranged at the sensor component.

25. The method according to claim 24, wherein the window is cleaned after its detachment from the sensor component.

* * * * *